(12) United States Patent
Trabucco

(10) Patent No.: US 11,492,825 B2
(45) Date of Patent: Nov. 8, 2022

(54) DOOR HANDLE, DOOR INTERIOR TRIM, AND TRANSPORTATION VEHICLE

(71) Applicant: VOLKSWAGEN AKTIENGESELLSCHAFT, Wolfsburg (DE)

(72) Inventor: Luigi Trabucco, Wolfsburg (DE)

(73) Assignee: Volkswagen Aktiengesellschaft

( * ) Notice: Subject to any disclaimer, the term of this patent is extended or adjusted under 35 U.S.C. 154(b) by 895 days.

(21) Appl. No.: 16/337,147

(22) PCT Filed: Sep. 19, 2017

(86) PCT No.: PCT/EP2017/073617
§ 371 (c)(1),
(2) Date: Mar. 27, 2019

(87) PCT Pub. No.: WO2018/060006
PCT Pub. Date: Apr. 5, 2018

(65) Prior Publication Data
US 2019/0218836 A1     Jul. 18, 2019

(30) Foreign Application Priority Data
Sep. 28, 2016 (DE) .................... 10 2016 218 693.0

(51) Int. Cl.
*E05B 85/12*    (2014.01)
*B60R 13/02*    (2006.01)
(Continued)

(52) U.S. Cl.
CPC ............. *E05B 85/12* (2013.01); *B60K 35/00* (2013.01); *B60K 37/00* (2013.01); *B60K 37/06* (2013.01);
(Continued)

(58) Field of Classification Search
CPC .. B60K 37/00; E05B 85/12; B60R 2013/0287
(Continued)

(56) References Cited

U.S. PATENT DOCUMENTS

| 8,120,477 B2 | 2/2012 | Hedrich |
| 8,994,676 B2 | 3/2015 | Kuhn et al. |

(Continued)

FOREIGN PATENT DOCUMENTS

| CN | 101312000 A | 11/2008 |
| CN | 101513826 A | 8/2009 |

(Continued)

OTHER PUBLICATIONS

Office Action for Korean Patent Application No. 10-2019-7009710; dated Sep. 10, 2020.
(Continued)

*Primary Examiner* — Suchin Parihar
(74) *Attorney, Agent, or Firm* — Barnes & Thornburg, LLP

(57) ABSTRACT

A door interior trim, a transportation vehicle, and a door handle for a transportation vehicle. The door handle includes a handle piece, a display device arranged on the handle piece, and an actuating device arranged on an indicator device, wherein the display device visualizes different function buttons based on an operating state of the transportation vehicle.

20 Claims, 3 Drawing Sheets

(51) Int. Cl.
*B60K 37/06* (2006.01)
*B60K 35/00* (2006.01)
*B60K 37/00* (2006.01)

(52) U.S. Cl.
CPC .... *B60R 13/0243* (2013.01); *B60K 2370/143* (2019.05); *B60K 2370/1442* (2019.05); *B60K 2370/1537* (2019.05); *B60K 2370/186* (2019.05); *B60K 2370/794* (2019.05); *B60R 2013/0287* (2013.01)

(58) Field of Classification Search
USPC ......................................................... 292/336
See application file for complete search history.

(56) References Cited

U.S. PATENT DOCUMENTS

| | | | |
|---|---|---|---|
| 9,696,542 B2 | 7/2017 | Kim et al. | |
| 10,589,672 B1* | 3/2020 | Chakrapani | E05B 81/77 |
| 10,665,140 B1* | 5/2020 | Ahn | B60Q 1/04 |
| 11,001,145 B2* | 5/2021 | Trabucco | E05B 81/54 |
| 2009/0211157 A1* | 8/2009 | Hedrich | E05B 77/54 |
| | | | 49/70 |
| 2010/0011821 A1* | 1/2010 | Kim | E05B 85/12 |
| | | | 70/264 |
| 2012/0133169 A1 | 5/2012 | George et al. | |
| 2014/0001777 A1* | 1/2014 | Choi | E05B 85/12 |
| | | | 292/336.3 |
| 2015/0315839 A1 | 11/2015 | Shigemoto et al. | |
| 2016/0129851 A1* | 5/2016 | Werner | G06F 3/0482 |
| | | | 701/49 |
| 2018/0345791 A1* | 12/2018 | Hallack | B60Q 3/217 |
| 2019/0078360 A1* | 3/2019 | Blount | E05B 85/103 |
| 2019/0169888 A1* | 6/2019 | Gabriel | E05B 79/02 |
| 2019/0193509 A1* | 6/2019 | Hélot | B60K 35/00 |
| 2019/0241071 A1* | 8/2019 | Trabucco | E05B 81/54 |
| 2020/0032560 A1* | 1/2020 | Rivaya | E05B 77/34 |
| 2020/0264705 A1* | 8/2020 | Taninaka | G06F 3/0436 |
| 2021/0025203 A1* | 1/2021 | Bendel | E05B 81/90 |
| 2021/0206326 A1* | 7/2021 | Hagihara | B60R 11/0235 |
| 2021/0302147 A1* | 9/2021 | Chabrowski | E05B 81/76 |
| 2022/0074229 A1* | 3/2022 | Konrad | B60Q 3/745 |
| 2022/0153214 A1* | 5/2022 | Tanabe | B60R 16/037 |

FOREIGN PATENT DOCUMENTS

| | | |
|---|---|---|
| CN | 103573023 A | 2/2014 |
| CN | 105584326 A | 5/2016 |
| DE | 102004045885 A1 | 3/2006 |
| DE | 102005045204 B3 | 11/2006 |
| DE | 102006055100 A1 | 5/2008 |
| DE | 102009024386 A1 | 12/2010 |
| DE | 112010000805 T5 | 7/2012 |
| DE | 102013016341 A1 | 4/2015 |
| DE | 102013114794 A1 | 4/2015 |
| KR | 20120117759 A | 10/2012 |
| KR | 20150059495 A | 6/2015 |
| KR | 20150102427 A | 9/2015 |

OTHER PUBLICATIONS

Office Action for Chinese Patent Application No. 201780060062.3; dated Aug. 26, 2021.
Search Report for International Patent Application No. PCT/EP2017/073617; dated Dec. 21, 2017.

* cited by examiner

DOOR HANDLE, DOOR INTERIOR TRIM, AND TRANSPORTATION VEHICLE

PRIORITY CLAIM

This patent application is a U.S. National Phase of International Patent Application No. PCT/EP2017/073617, filed 19 Sep. 2017, which claims priority to German Patent Application No. 10 2016 218 693.0, filed 28 Sep. 2016, the disclosures of which are incorporated herein by reference in their entireties.

SUMMARY

Illustrative embodiments relate to a door handle for a transportation vehicle, a door interior trim and a transportation vehicle. Illustrative embodiments relate, in particular, to a space-saving implementation of a device for actuating a door, which, in terms of design, maintains a free space.

BRIEF DESCRIPTION OF THE DRAWINGS

Further details are disclosed from the following descriptions with reference to the accompanying drawings. In the drawings.

DETAILED DESCRIPTION

Figure 1:
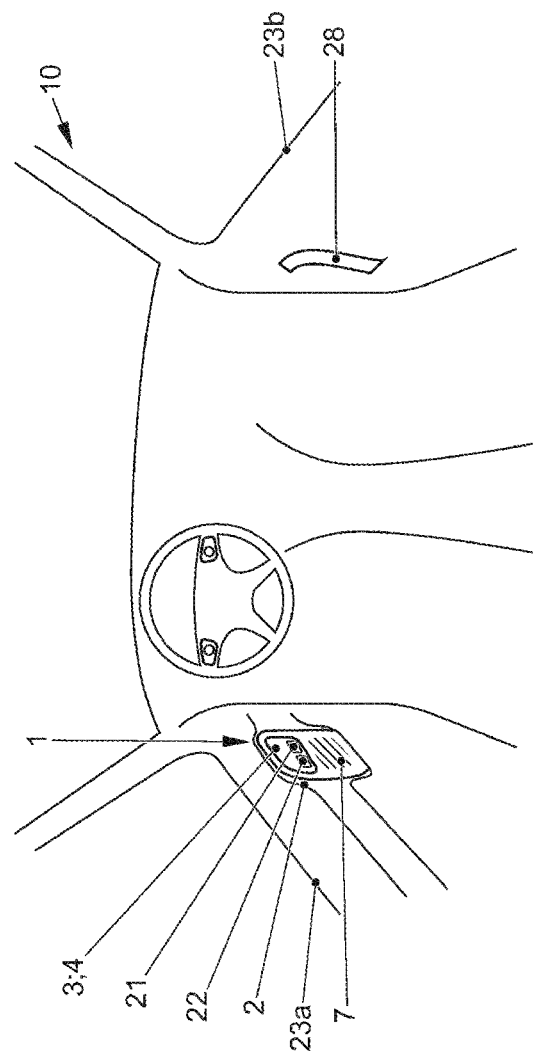
FIG. 1 is a perspective view of a driver's seat of an exemplary embodiment of a transportation vehicle.

Due to the large number of different control elements in the door of transportation vehicle, users occasionally lose track of these control elements, in particular, when using unfamiliar vehicles. Additionally, in terms of design, free space is lost when designing door interior trims. Moreover, a large amount of space is required as a result of the control elements being positioned at different locations on the door interior trim. Furthermore, the mounting of the control elements is complex. Moreover the feeling of space is impaired, which becomes apparent to the user as a result of the plurality of control elements.

A door handle is always provided for moving the door (pulling the door closed and/or pushing the door open), the door handle undertaking the force transmission to the door leaf by a stable handle piece.

When using control elements embodied in hardware, these control elements are present at all times irrespective of the operating state of the transportation vehicle. The arrangements known in the prior art fall short of their theoretical potential. Disclosed embodiments fulfill the requirement identified above.

This is achieved by a door handle for a transportation vehicle. The transportation vehicle may, for example, be a passenger transportation vehicle, van, truck, aircraft and/or watercraft. The door handle comprises a handle piece which serves for transmitting force between a hand of the user and the door interior trim and/or the door. The handle piece, for example, may have a knob shape, a curved shape, or the like or be designed in the shape of a projection. A display device which may display, for example, programmable contents is arranged on the handle piece. Symbols and icons may be shown by the display device. The display device is covered by an actuating device. This actuating device may be designed, for example, as a touch-sensitive surface in the manner of a touchscreen. In other words, the actuating device and the display device form a graphic user interface. It is provided to visualize different function buttons on the display device based on an operating state of the transportation vehicle. In this manner, space may be saved and a clear view of the function buttons which are currently able to be operated is maintained. Function buttons and functions not required when the transportation vehicle is traveling may be visually concealed and/or the space provided therefor may be used for other purposes. This does not require other function buttons having to be displayed instead of the previous function buttons. Alternatively, the function button may disappear and/or be replaced by visually attractive aesthetic features.

Optionally, the door handle may be designed as a door closing handle. In other words, the door handle serves for pulling the door closed into a closed state. To this end, the door handle has a cavity behind the display device, the user being able to engage therein. In other words, a handle recess or the like is provided on a rear face of the display device. This is the case, when the display device has a viewing plane which is arranged substantially parallel to the plane of the door interior trim. In other words, in such a case the viewing plane of the display device is substantially located in the X-Z plane (vehicle coordinate system). Alternatively or additionally, the door handle may be designed as a door opening handle, i.e., have a surface by which the user sitting in the transportation vehicle is able to exert a compressive force on the door leaf and/or the door interior trim. In such a case, so that function calls are not inadvertently performed by the actuating device, the actuating device may be designed no longer to accept inputs in response to a predefined condition. In other words, actuations of the actuating device in response to the presence of the predefined condition are at least no longer taken as a reason for a function call. The predefined condition may, for example, comprise removing a transportation vehicle key and/or a terminal change of the transportation vehicle. Alternatively or additionally, the locking or unlocking of a belt buckle of a seat belt may be a component of the predefined condition. Alternatively or additionally, the unlocking of the door in which the door handle is located may form a component of the predefined condition. Alternatively or additionally, the actuation of a button, in particular, for opening or unlocking the door, may be a component of the predefined condition. In this manner, the input surface of the display device/actuating device may also be used for the mechanical operation of the door.

The display device may be designed to display an unlocking symbol for the door. If the user selects the unlocking symbol a motor is actuated, the motor unlocking the door of the transportation vehicle in which the door handle is located. In other words, generally a handle designed as a pull lever in the prior art is superfluous for unlocking the door in the manner according to the disclosure, or at any rate at least complemented thereby.

The visual appearance, haptic impression and input of foreign bodies may be reduced by the actuating device having a bulged surface, in particular, of convex design, which is substantially aligned with a surface of the handle piece located remotely from the actuating device. The display device may also have a bulged surface which corresponds to the bulged surface of the actuating device (is designed substantially parallel thereto).

Significant benefits may be provided by the use of an ePaper, eInk or the like. On the one hand, an ePaper may be designed to be exceptionally thin and with a bulged surface. Additionally, the visibility of the symbols shown is relatively independent of the environmental conditions. Additionally, the energy requirement for operating the ePaper is very low, a backlight is not required and the ePaper does not substantially heat up during operation which is very comfortable for the user in terms of haptics.

The disclosed door handle may be designed to be ergonomic and safe, by the door handle having at least two surface regions oriented substantially in different directions (for example, at right angles) which represent parts of the actuating device able to be touched by the user. Safety functions may be implemented in cooperation with user inputs which are performed simultaneously on both surface regions. For example, a simultaneous actuation of two function buttons, one thereof being arranged on the first surface region and the second thereof being arranged on the second surface region, are required for a function call. For example, a plurality of function buttons may also be displayed in the first surface region and a slider shown and implemented on the second surface region. Depending on which function button the user actuates or holds pressed down on the first surface region, a substantially stepless adaptation of the parameter may be undertaken by the user via simultaneous actuation of the slider. In this manner, for example, window lifters, fan stages, temperature adjustments, etc. may be ergonomically activated and/or undertaken. In addition, the unlocking of the door on which the door handle is located may be dependent on the requirement of a simultaneous actuation of two function buttons, the first thereof being arranged on the first surface region and the second thereof being arranged on the second surface region. In this manner, accidental unlocking of the door by inadvertent contact with a single function button may be avoided.

The door handle may be designed in a visually attractive manner if it is produced in one piece with a loudspeaker grill. As a result, the large number of parts may be reduced. The use of an at least partially transparent material for the loudspeaker grill may classify the disclosed door handle as a component of an ambient light unit. In other words, a lighting method or mechanism (for example, RGB LEDs) may be arranged behind the loudspeaker grill to use the loudspeaker grill as a light guide or diffusor.

According to a second disclosed embodiment, a door interior trim for a transportation vehicle is proposed. The door interior trim may be provided and designed, for example, for a driver's door, a passenger door or a rear door. It comprises a door handle according to the first-mentioned disclosed embodiment and, in particular, also a loudspeaker which is arranged at least partially behind the door handle. Signals of a multimedia system (entertainment system) of the transportation vehicle may be reproduced via the loudspeaker. To this end, the loudspeaker may be part of a loudspeaker assembly, identical signals being able to be applied thereto. Alternatively or additionally, the loudspeaker may be used to acknowledge user inputs on the actuating device and/or to make the user acoustically aware of an output shown on the display device.

According to a third disclosed embodiment, a transportation vehicle, which is designed, for example, as a passenger transportation vehicle, van, truck, aircraft and/or watercraft, is proposed. The transportation vehicle comprises a door handle according to the first-mentioned disclosed embodiment and/or a door interior trim according to the second-mentioned disclosed embodiment. Thus it is apparent that both the door interior trim and the transportation vehicle implement the features, combinations of features and benefits of the disclosed door handle resulting therefrom in a corresponding manner, such that, to avoid repetition reference, is made to the above embodiments.

FIG. 1 shows a driver's seat of a passenger transportation vehicle 10 as an exemplary embodiment of a disclosed transportation vehicle. A door handle 1 is arranged in the driver's door 23a, the driver being able to pull closed and push open the driver's door 23a thereby. To operate various functions, a display device 3 and a control device 4 covering the display device 3 are provided. In the lower half of the display device 3 two function buttons 21, 22 are shown, as long as the driver's door 23a is closed and the user is located on the driver's seat. For a comparison with the disclosed embodiment of the driver's door 23a, the passenger door 23b is provided with a projection-shaped door closing handle 28 according to the prior art. The optional design of the door handle 1 with a loudspeaker grill 7 permits a visually uniform and thus a high-quality appearance of the door interior trim of the driver's door 23a.

Figure 2:
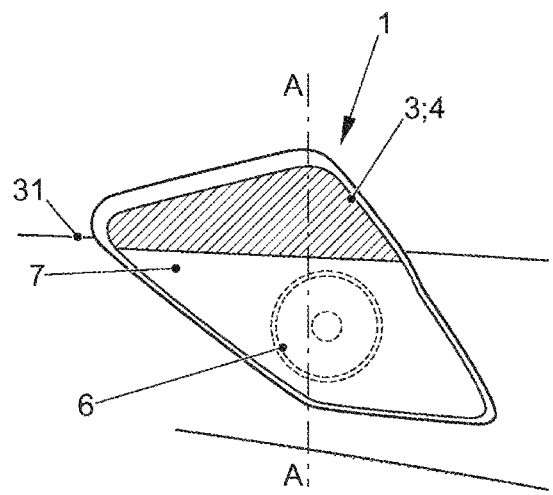
FIG. 2 is a side view of an exemplary embodiment of a door handle.

FIG. 2 shows a side view of a disclosed door handle 1 and which in an upper region of its main surface is provided with a display unit 3 in the manner of an ePaper with a touch-sensitive surface 4 as a control device. Below the display unit a loudspeaker grill 7 is provided with a loudspeaker 6 arranged to the rear thereof. The door handle 1 has a peripheral handle recess 5 whereby it is possible to grasp behind the display device 3 and the touch-sensitive surface 4 and/or the loudspeaker grill 7 to pull closed the door provided with the door handle 1. The display device 3 and the touch-sensitive surface 4 are located substantially above an armrest 31 to permit an ergonomic actuation of function buttons which are shown on the display device 3. A cutting line A-A identifies the position along which a cut has been made to obtain the sectional view shown in FIG. 3.

Figure 3:
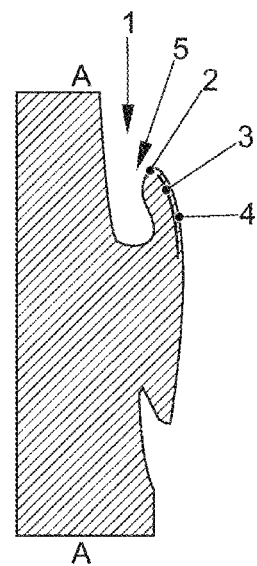
FIG. 3 is a sectional view cut along a line A-A in FIG. 2 of the exemplary embodiment of the door handle shown in FIG. 2.

FIG. 3 shows the door handle 1 shown in FIG. 2 in a sectional view produced along the cutting line extending along the line A-A. A design of the handle recess 5 is revealed from the sectional view according to FIG. 3. The handle recess 5 permits the fingers of the user to be placed comfortably therein whilst the user is able to control with the thumb the touch-sensitive surface 4 which is arranged in front of the display device 3. Optionally, a capacitive or ultrasound-based sensor may be used (not shown in the present case) to detect the engagement of a user in the handle recess 5 and in response thereto to activate the touch-sensitive surface 4 and/or to show optionally available control elements on the display device 3. This permits an energy-saving and visually attractive design of the disclosed door handle 1.

Figure 4:
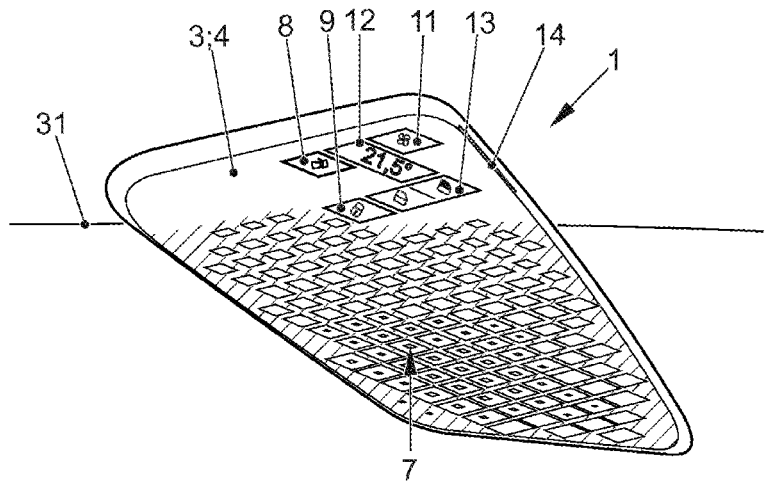
FIG. 4 is a side view of a further exemplary embodiment of a door handle in a first operating state.

FIG. 4 shows a further exemplary embodiment of a disclosed door handle 1 in a first operating state. Function buttons 8, 9, 11, 12, 13 corresponding to the pattern of the loudspeaker grill 7 are shown above the armrest 31. The function button 8 serves for unlocking the driver's door. The function button 9 serves for closing the transportation vehicle. The function button 11 serves, in combination with a slider 14 shown on a front face of the door handle 1, for the substantially stepless adaptation of a fan power. The function button 12 serves for increasing and/or reducing a set temperature of the airflow and as a two-part function button is modeled on a rocker switch. The function button 13 serves for lifting and/or lowering the side windows of the driver's door. This may be carried out by the user touching/ holding the surface region of the function button 13 located top right with the thumb and at the same time actuating the slider 14 with the fingertip of the index finger until the window has a desired degree of opening. In this manner, it is avoided that inadvertent contact with the function button 13 alone leads to the closing of the side window. The region of the function button 13 located bottom left serves for fully opening the side window without the slider having to be actuated therefor. This is possible without actuating the slider 14 since a trapping risk is not present when opening the side windows.

Figure 5:
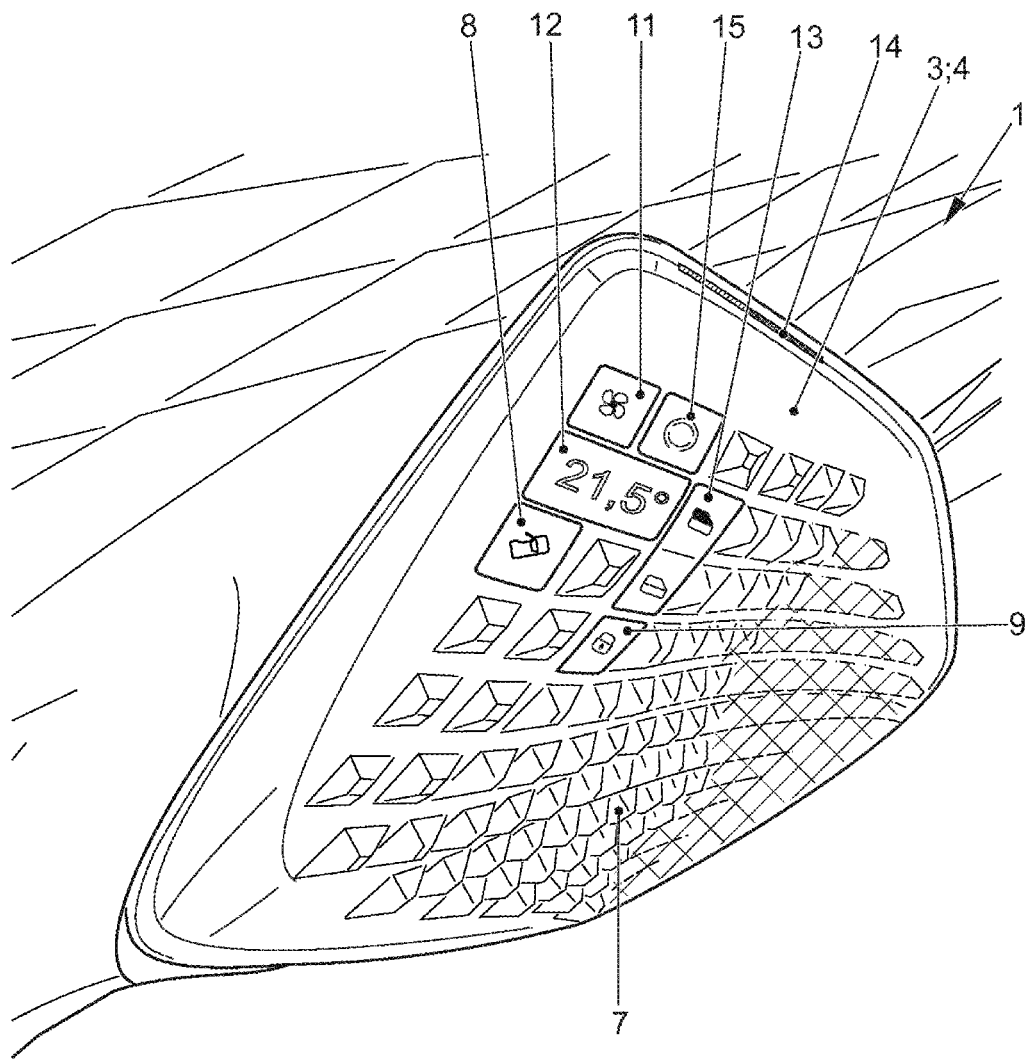
FIG. 5 is a side view of a further exemplary embodiment of a door handle in a second operating state.

FIG. 5 shows a side view of a design substantially corresponding to the exemplary embodiment according to FIG. 4 of a disclosed door handle 1. Additionally a function button 15 is displayed, the user being able to activate thereby an automatic longitudinal and transverse guidance of the transportation vehicle. As soon as the function button 15 has been actuated and the transportation vehicle has been successfully changed into highly automated driving mode, the function button 15 disappears to clear the door handle 1 visually until the user assumes control of the transportation vehicle, automatically terminates the highly automated driving mode and the function button 15 is displayed again. Now the user may once again change into highly automated driving mode by actuating the function button 15.

Whilst the features and beneficial embodiments have been described in detail with reference to the exemplary embodiments described in combination with the accompanying drawings, for the person skilled in the art modifications and combinations of features of the exemplary embodiments shown are possible without departing from the field of the present disclosure, the protected field thereof being defined by the accompanying claims.

LIST OF REFERENCE NUMERALS

1 Door handle
2 Handle piece
3 Display device
4 Actuating device
5 Handle recess
6 Loudspeaker
7 Loudspeaker grill
8, 9 Function buttons
10 Passenger transportation vehicle
11, 12, 13 Function buttons
14 Slider
15 Function button
21, 22 Function buttons
23a Driver's door
23b Passenger door
28 Conventional door handle
31 Armrest

The invention claimed is:

1. A door handle for a transportation vehicle, the door handle comprising:
a handle piece arranged on a first surface of an interior of the transportation vehicle, wherein at least a portion of the handle piece is coupled to the first surface via a coupling portion of the handle piece;
a display device arranged on a front surface of the handle piece substantially facing a seated position of a user of the transportation vehicle; and
an actuating device arranged on the display device,
wherein the handle piece includes a recess formed therein, the recess defining a rear surface of the handle piece located opposite the display device that faces the first surface, the recess opening away from the coupling portion to allow engagement by the user, and
wherein the display device displays different function buttons based on an operating state of the transportation vehicle.

2. The door handle of claim 1, wherein the door handle is designed as a door opening handle and the actuating device no longer accepts inputs in response to a predefined condition.

3. The door handle of claim 1, wherein the display device displays an unlocking symbol, and, in response to selection of the unlocking symbol, the actuating device emits a signal for unlocking a door of the transportation vehicle.

4. The door handle of claim 1, wherein the actuating device has a bulged surface which is substantially aligned with a surface of the handle piece located remotely from the actuating device.

5. The door handle of claim 1, wherein the display device is an ePaper.

6. The door handle of claim 1, wherein the display device and the actuating device further comprise a surface with two surface regions oriented in different directions and the display device that:
displays a plurality of function buttons of a first surface region; and
displays a slider element on the second surface region.

7. The door handle of claim 6, wherein the control device emits a signal only in response to a simultaneous actuation of one of the function buttons and the slider for:
actuating a window lifter; or
unlocking a door.

8. The door handle of claim 1, further comprising:
a partially transparent loudspeaker grill; and/or
a light source for producing an ambient light.

9. The door handle of claim 1, wherein the first surface is a door interior trim of a door of the transportation vehicle, and wherein the rear surface of the handle piece is substantially parallel with the door interior trim.

10. A door interior trim for a transportation vehicle, comprising:
a door handle for a transportation vehicle, the door handle comprising:
a handle piece arranged on a first surface of the door interior trim of the transportation vehicle, wherein at least a portion of the handle piece is coupled to the first surface via a coupling portion of the handle piece;
a display device arranged on a front surface of the handle piece substantially facing a seated position of a user of the transportation vehicle; and
an actuating device arranged on the display device,
wherein the handle piece includes a recess formed therein, the recess defining a rear surface of the handle piece located opposite the display device that faces the first surface, the recess opening away from the coupling portion to allow engagement by the user, and
wherein the display device displays different function buttons based on an operating state of the transportation vehicle; and
a loudspeaker arranged at least partially behind the door handle.

11. The door interior trim of claim 10, wherein the door handle is designed as a door opening handle and the actuating device no longer accepts inputs in response to a predefined condition.

12. The door interior trim of claim 10, wherein the display device displays an unlocking symbol, and, in response to selection of the unlocking symbol, the actuating device emits a signal for unlocking a door of the transportation vehicle.

13. The door interior trim of claim 10, wherein the actuating device has a bulged surface which is substantially aligned with a surface of the handle piece located remotely from the actuating device.

14. The door interior trim of claim 10, wherein the display device is an ePaper.

15. The door interior trim of claim 10, wherein the display device and the actuating device further comprise a surface with two surface regions oriented in different directions and the display device that:
  displays a plurality of function buttons of a first surface region; and
  displays a slider element on the second surface region.

16. The door interior trim of claim 15, wherein the control device emits a signal only in response to a simultaneous actuation of one of the function buttons and the slider for:
  actuating a window lifter; or
  unlocking a door.

17. The door interior trim of claim 10, further comprising:
  a partially transparent loudspeaker grill; and/or
  a light source for producing an ambient light.

18. The door interior trim of claim 10, wherein the rear surface of the handle piece is substantially parallel with the door interior trim.

19. A transportation vehicle comprising a door handle or a door interior trim for a transportation vehicle, wherein the door handle or the door interior trim comprises:
  a handle piece arranged on a first surface of an interior of the transportation vehicle, wherein at least a portion of the handle piece is coupled to the first surface via a coupling portion of the handle piece;
  a display device arranged a front surface on the handle piece substantially facing a seated position of a user of the transportation vehicle; and
  an actuating device arranged on the display device,
  wherein the handle piece includes a recess formed therein, the recess defining a rear surface of the handle piece located opposite the display device that faces the first surface, the recess opening away from the coupling portion to allow engagement by the user, and
  wherein the display device displays different function buttons based on an operating state of the transportation vehicle.

20. The transportation vehicle of claim 19, wherein the door interior trim includes a loudspeaker arranged at least partially behind the door handle.

\* \* \* \* \*